(12) United States Patent
Schwinning et al.

(10) Patent No.: US 9,638,356 B2
(45) Date of Patent: May 2, 2017

(54) WALL LEAD-THROUGH

(71) Applicant: PFLITSCH GmbH & Co.KG, Hueckeswagen (DE)

(72) Inventors: Ulrike Schwinning, Hueckeswagen (DE); Martin Lechner, Lindlar (DE)

(73) Assignee: PFLITSCH GMBH & CO. KG, Hueckeswagen (DE)

( * ) Notice: Subject to any disclaimer, the term of this patent is extended or adjusted under 35 U.S.C. 154(b) by 0 days.

(21) Appl. No.: 14/905,609

(22) PCT Filed: May 6, 2014

(86) PCT No.: PCT/DE2014/100159
§ 371 (c)(1),
(2) Date: Jan. 15, 2016

(87) PCT Pub. No.: WO2015/021959
PCT Pub. Date: Feb. 19, 2015

(65) Prior Publication Data
US 2016/0153589 A1 Jun. 2, 2016

(30) Foreign Application Priority Data
Aug. 15, 2013 (DE) .................. 20 2013 103 712 U

(51) Int. Cl.
E04C 1/39 (2006.01)
F16L 5/10 (2006.01)
(Continued)

(52) U.S. Cl.
CPC ................ *F16L 5/10* (2013.01); *E04C 2/521* (2013.01); *F16L 5/02* (2013.01); *F16L 5/027* (2013.01); *H02G 3/22* (2013.01)

(58) Field of Classification Search
CPC ..... F16L 5/02; F16L 5/10; F16L 5/027; E04C 2/521; H02G 3/22
See application file for complete search history.

(56) References Cited

U.S. PATENT DOCUMENTS 1,555,480 A * 9/1925 Olcott ....................... F16L 5/00
126/317
1,678,388 A * 7/1928 Holden ..................... F16L 5/00
126/317
(Continued)

FOREIGN PATENT DOCUMENTS

DE 102009039865 B 3/2011
GB 1566641 B 5/1980
NL 1001028 A 5/1997

*Primary Examiner* — Patrick Maestri
(74) *Attorney, Agent, or Firm* — Andrew Wilford

(57) ABSTRACT

The invention relates to a wall feed-through fitting for passing elongated parts, pipes, wires, and/or cables through a wall of piece of equipment, housing or component provided with the wall that has a throughgoing hole and where a flange (1) is fastened to the wall by a fastener, the flange having a hole (2) coaxial to the throughgoing hole, wherein the flange (1) has two half-flanges (3) that abut at a parting plane crossing the hole (2), the half-flanges are connected or connectable to one another by integrally molded connecting formations (4), and the half-flanges (3) are of identical shape with each of the half-flanges (3) having a first connecting formation at one respective parting face and a second connecting formation at a second respective parting face and the first and second connecting formations are different from one another but fit complementarily with one another in a desired mounting position of the half-flanges (3).

12 Claims, 2 Drawing Sheets

(51) Int. Cl.
  *F16L 5/02*  (2006.01)
  *H02G 3/22*  (2006.01)
  *E04C 2/52*  (2006.01)

(56) References Cited

U.S. PATENT DOCUMENTS

| | | | | |
|---|---|---|---|---|
| 5,103,609 A | * | 4/1992 | Thoreson | A62C 2/065 |
| | | | | 52/232 |
| 8,689,503 B2 | | 4/2014 | Fischer | |
| 2008/0118216 A1 | * | 5/2008 | Riley | G02B 6/4459 |
| | | | | 385/136 |
| 2014/0325933 A1 | | 11/2014 | Marcigot | |

* cited by examiner

WALL LEAD-THROUGH

CROSS REFERENCE TO RELATED APPLICATIONS

This application is the US-national stage of PCT application PCT/DE2014/100159 filed 6 May 2014 and claiming the priority of German patent application 202013103712.5 itself filed 15 Aug. 2013.

FIELD OF THE INVENTION

The invention relates to a wall feed-through fitting for passing elongated parts, pipes, wires, and/or cables through walls of equipment, housings or components provided with a wall that has a throughgoing hole and where a flange is fastened to the wall by a fastener, the flange having a hole coaxial to the throughgoing hole.

BACKGROUND OF THE INVENTION

Devices in the form of double nipples having threaded connector end parts, a sealing body, and a pressure screw are known for the purpose of forming such wall feed-through fittings. In order to make it possible with such configurations to replace damaged or destroyed devices of the indicated kind in existing installations, it is known to have the make the fitting of several parts, namely, a double nipple that is divided along a longitudinal center, a sealing insert that is divided along the longitudinal center, and a pressure screw that is divided along the longitudinal center. Such a configuration makes it readily possible to replace such device parts, even with preexisting installations.

However, wall feed-through fittings of the generic type are also known in the prior art. Here, again, the wall has a hole. A two-part flange is fastened to the wall by a suitable fastener, the flange also having a hole that is aligned coaxially to the throughgoing hole. Optionally, such a flange is again equipped with a seal that surrounds its hole, and that, through an appropriate design of the flange, makes it possible to brace it against the elongated parts, pipes, wires, or cables guided through the hole when the flange is fastened, if the flange is thus tightened against the wall by a fastener. Such a configuration is also very useful and helpful. However, the known divided flanges have a problem in that the installation of such a flange is very complicated and difficult, because the individual parts are insufficiently positioned and guided through the wall relative to one another.

OBJECT OF THE INVENTION

In light of the prior art, the invention addresses the problem of providing a wall feed-through fitting of this type, with which the flange can be easily and securely mounted when, for example, cables premounted with connectors pass through, or even at a later time with existing installations, for example, to replace a damaged or destroyed flange, and a particularly cost-effective embodiment of the corresponding flange is desired.

SUMMARY OF THE INVENTION

To solve this problem, the invention proposes that the flange has two half-flanges that abut at a parting plane crossing the hole, the half-flanges being connected or connectable to one another by integrally molded connecting formations, and that the half-flanges have an identical shape in that each of the half-flanges has a first connecting formation at one parting face and a second connecting formation at a second parting face and the connecting formations are different from one another but fit complementarily with one another in a desired mounting position of the half-flanges.

Separating the flange into two half-flanges makes it possible to later replace this flange in an existing installation because the half-flanges can be placed onto the elongated parts or the like transversely their longitudinal extension, can be connected to each other, and can be fastened to the wall part. In addition, it is also essential that the half-flanges be of the very same shape. This ensures a particularly cost-effective manufacture. One only needs tools for producing a half-flange, as with the formation of a one-piece flange. Also, it is only necessary to store one type of half-flange to assemble a complete flange. This reduces the cost of producing such parts, the costs of storage, and also the difficulty of assembly.

According to an embodiment of the invention each of the half-flanges has a female latch formation at a first parting part of the two parting faces thereof, and a complementary male latch formation at a second parting face, and in the desired mounting position the male latch formation of each half-flange engages with the female latch formation of the other half-flange so that the two half-flanges are thereby latched together.

According to this embodiment, the half-flanges are easily brought together, and can be correctly positioned relative to one another due to the male latch formation of one part being inserted into the female latch formation of the other part. The flange thus prepared can then be conventionally fastened to the wall of the housing or the like with a fastener.

Optionally, each of the latches is preferably formed as a hook having a rounded back, the female formation then is a bolt surrounded by a guide groove generally complementary to the shape of the hook.

Such a configuration forms a guide aid for the user when the half-flanges are being mounted. In particular, it is preferably provided that in the flange formed by the half-flanges, an annular seal is used that is fixed in the desired mounting position between a sealing press surface of the flange that surrounds the hole thereof, and the wall part surrounding the hole of the wall, and that is pressed radially against the passed-through elongated part or parts.

Such an annular seal is known per se in the prior art.

In this embodiment the seal is preferably formed by a ring that has at least one slot, or formed by two half-rings that lie close against one another at the parting face or faces in the desired mounting position.

This makes it possible not only to easily replace the flange but also to easily replace the seal in existing installations if, for example, the flange and/or the seal is damaged.

When, for example, cables or lines premounted with connectors are passed through, it is hereby also possible to have a simple and secure seal.

In order to ensure the proper positioning of the half-flanges in the desired mounting position, the parting face of each half-flange has a recess at an edge thereof that is adjacent the wall and with which an extension of the other half-flange that is an extension of the guide groove engages in the desired mounting position.

A particularly preferred embodiment provides that the connecting formations are configured like a hinge and each of the half-flanges has a hinge pin at a first parting face of the two parting faces thereof and a hinge hook at a second parting face such that in the desired mounting position the hinge pin of each half-flange engages with the hinge hook of the other half-flange and the two half-flanges are thereby latched together.

This configuration ensures that the two half-flanges form after manual assembly of the parts a structure whose solidarity is already ensured if these parts are secured to the housing wall or the like. The subsequent fastening with the fasteners ensures the final secure positioning on the housing part.

Wall parts preferably formed on the parting faces of the half-flanges extend parallel to the parting plane, lie flat against one another in the desired mounting position, and form an insertion limitation for the latch or a hinging limitation for the hinge joint.

It is also particularly preferably provided that the hinge hook is open on the outer side of the half-flange that faces away from the wall.

For the purpose of mounting, the corresponding configuration makes it possible to first fit together the two half-flanges in an inclined position relative to one another so as to introduce the hinge pin into the hinge hook formed as an open bearing shell. The parts are then pivoted into the desired position in which they are parallel to each other. Then, the wall parts located at the parting face lie flat against one another and form a stop or insertion limit for the hinge joint or for the above-described latch.

It is also preferably provided that the flange formed by the half-flanges has a plurality of throughgoing openings that are offset from the hole, axially parallel thereto, and penetrated by the fasteners in the desired mounting position.

It may also preferably be provided that the fasteners are screws.

To save room in the installation space, it is preferably provided that the flange is be rectangular, preferably square in plan view, and the fasteners are in the corners.

BRIEF DESCRIPTION OF THE DRAWING

Essential parts of the invention are shown in the attached drawing and described below in greater detail.

SPECIFIC DESCRIPTION OF THE INVENTION

Figure 1:
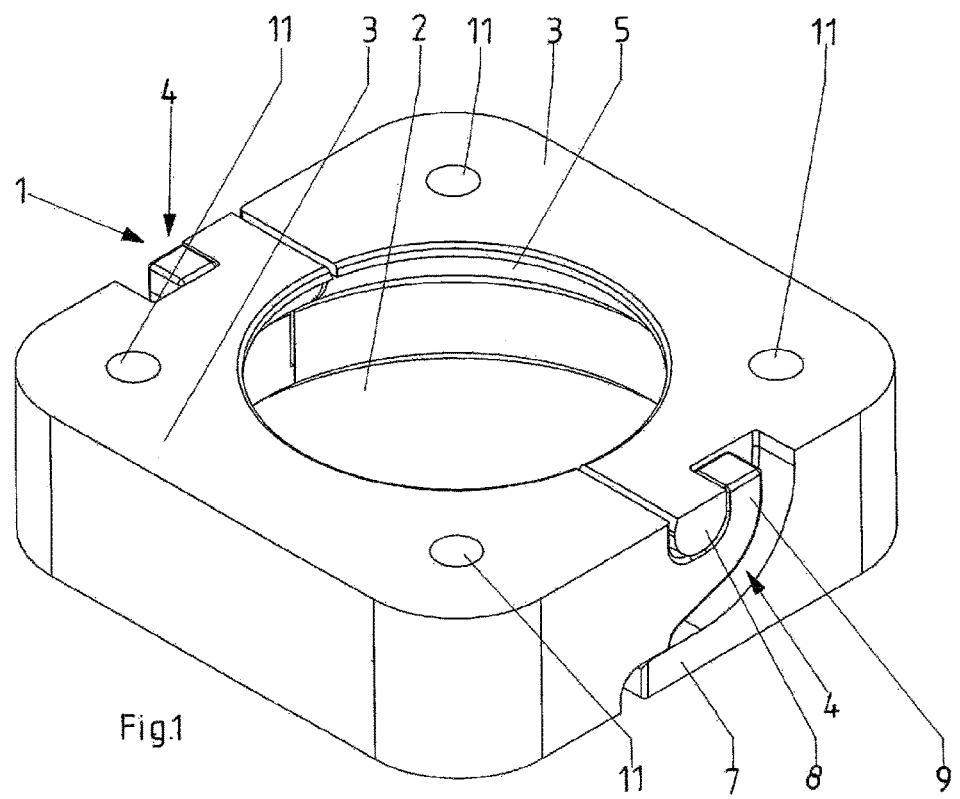
FIG. 1 is an isometric view of a flange made of two half-flanges.

The drawing shows essential elements of a wall feed-through fitting. Such a wall feed-through fitting is used for passing elongated parts such as pipes, wires, cables, or the like through walls of equipment, housings, or components provided with walls. The wall has a throughgoing hole. A flange 1 is fastened to the wall by a fastener. The flange has a hole 2 that is coaxial to the hole of the wall. During mounting, the flange is fastened to the housing wall. Elongated parts of any type can be passed through the hole 2 of the flange 1 and through the throughgoing hole of the housing. In order to retrofit such a flange in a preexisting installation if, for example, a flange is damaged or destroyed, then the invention provides that the flange 1 is formed by two half-flanges 3 that centrally cross the hole 2 thereof with a parting plane and that are connected to one another by integrally molded connecting formations 4. The half-flanges 3 thus have identical shapes and each form a respective half of the hole 2. They are thus manufactured in the same tool. Also, storage is simplified, because only one such part need be stored. Similarly, only one type of half-flanges need be stored by the mounter, if the installer wants to use such parts.

Each of the half-flanges 3 has a first and second parting face at the side facing the other half-flange 3 in the desired mounting position, these parting faces each being aligned radially relative to the hole 2. Preferably, an annular seal (not shown in the drawings) is inserted into the flange formed by the half-flanges 3, the annular seal being clamped in the desired mounting position between a pressing surface 5 of the flange 1 that surrounds the hole 2 thereof and the wall part surrounding the throughgoing hole of the wall. The seal is pressed by the surface 5 against the elongated part (or parts) that has been passed through, so as to achieve a favorable seal and optionally even a strain relief.

Such a seal is preferably formed by a slotted ring or two half-rings that abut one another at the parting plane or the parting faces in the desired mounting position, in order to be able to later insert or replace such a seal even in a preexisting installation.

The parting face of the half-flange 3 has a recess 6 at the edge thereof that is adjacent the wall of the housing, with which an extension 7 of the other half-flange 3 engages in the desired mounting position. Here, the connecting formations 4 are each configured like a hinge in that each of the half-flanges 3 has a hinge pin 8 at a first parting face of the two parting faces thereof, and a hinge hook 9 at a second parting face. In the desired mounting position illustrated in FIG. 1 the hinge pin 8 of each half-flange 3 is engaged with the hinge hook 9 of the other half-flange 3. The two half-flanges are thereby latched together.

Wall parts 10 that are aligned parallel to the parting plane are formed at the parting faces of the half-flanges 3, the wall parts lying flat against one another in the desired mounting position according to FIG. 1, and forming an insertion limitation or a hinging limitation for the hinge joint.

Figure 2:
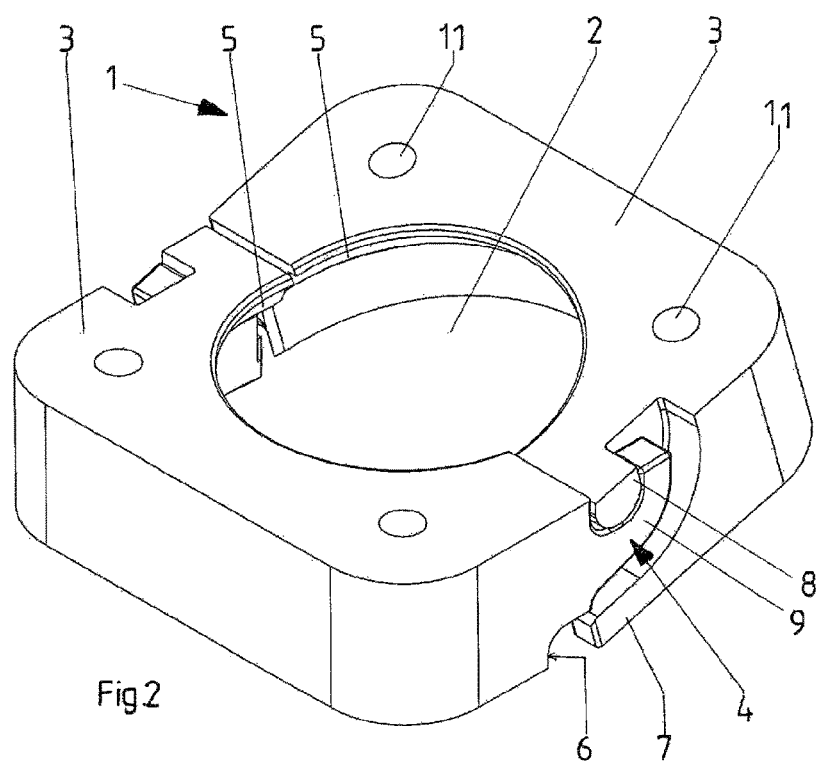
FIG. 2 shows it in a pre-mounting position.
Figure 3:
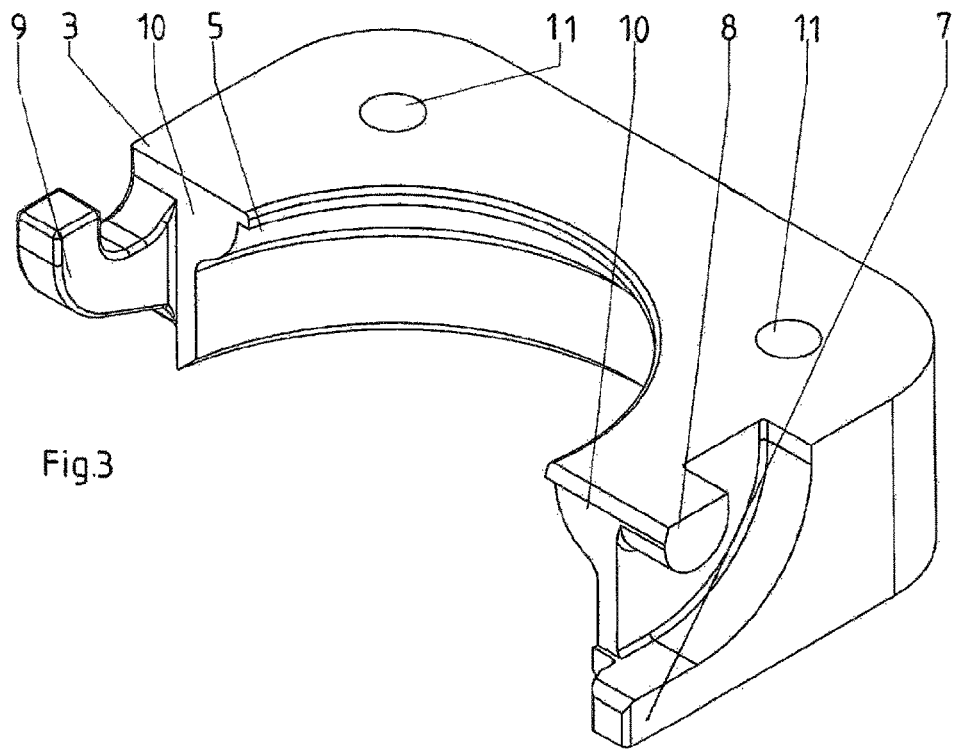
FIG. 3 is an isometric view of a half-flange.
Figure 4:
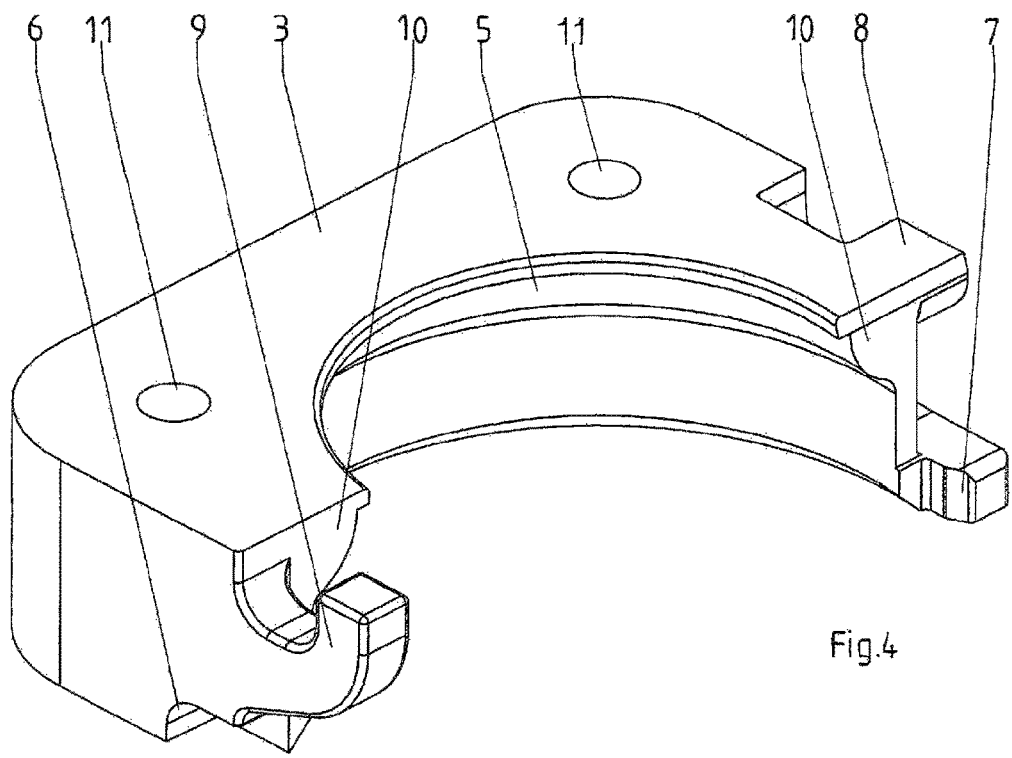
FIG. 4 shows the half-flange rotated by 180° relative to the position of FIG. 3.

The hinge hook 9 is formed to be open to the outer side of the half-flange 3 that faces away from the wall in the desired mounting position. To mount the half-flanges 3, the half-flanges 3 can be positioned relative to one another as illustrated in FIG. 2. Then, the two half-flanges are pivoted relative to one another so as to be in parallel to one another at the outer side and inner side, as illustrated in FIG. 1.

In addition to the through bore 2 for passing through elongated parts and the like, the flange formed by the half-flanges 3 has a plurality of throughgoing openings 11 that are intended for a fastener, e.g. screws, to be inserted therethrough, to fasten the flange 1 to the housing wall.

Here, the flange 1 is configured so as to be a square in plan view, the fasteners or the associated throughgoing openings 11 are at the corners.

The invention is not limited to the illustrated embodiment, but can be varied within the scope of the disclosure. All individual and combined features disclosed in the description and/or drawings are regarded as essential to the invention.

What is claimed is:

1. A wall feed-through fitting for passing an elongated part through a wall formed with a throughgoing hole, the fitting comprising:

two substantially identical and generally U-shaped half flanges each having a central semicylindrical half hole centered on an axis and two arms flanking the respective half hole and each having an outer end forming a face lying in a parting plane extending diametrally through the axis;

an arcuate groove formed on one of the arms of each of the flange-halves and opening at the respective face of each of the half flanges; and a respective hook open axially away from the wall and projecting from the other of the arms of each of the flange halves that is complementary to the arcuate groove and complementarily fittable therewith in a coplanar position of the two flanges lying against the wall at the throughgoing hole thereof, the two half flanges being fittable together by pivoting of the half flanges relative to each other such that each of the hooks of each of the flange halves engages and latches in the arcuate groove of the other of the flange halves.

2. The wall feed-through fitting according to claim 1, further comprising:

an annular seal in the hole formed by the half-flanges, fixed in the coplanar position of the half flanges that surround the hole and a part of the wall surrounding the hole, and pressed radially onto the elongated part.

3. The wall feed-through fitting according to claim 2, wherein the seal is formed by two half-rings that abut one another at the faces in the coplanar position.

4. The wall feed-through fitting according to claim 2, wherein the seal is formed by a ring that has a slot generally at one of the faces in the coplanar position.

5. The wall feed-through fitting according to claim 1, wherein the face of each half-flange has a recess at an edge thereof that is adjacent the wall and with which an extension of the other half-flange that is an extension of the guide groove engages in the coplanar position.

6. The wall feed-through fitting according to claim 1, wherein at the faces of the half-flanges, parts of the faces that extend parallel to the parting plane are formed that lie flat against one another in the desired mounting position and form an insertion limitation for the groove and hook.

7. The wall feed-through fitting according to claim 1, wherein the hook is open on an outer side of the half-flange that faces away from the wall.

8. The feed-through fitting defined in claim 1, wherein each of the half flanges is formed with at least one axially throughgoing hole through which a respective fastener can be engaged with the wall when the half flange is lying on the wall.

9. The wall feed-through fitting according to claim 8, wherein the fasteners are screws.

10. The wall feed-through fitting according to claim 8, wherein the fitting is rectangular and the fasteners are in corners of a flange formed by the assembled half flanges.

11. The wall feed-through fitting according to claim 8, wherein a flange formed by the half-flanges has a plurality of throughgoing openings that are offset from the hole, axially parallel thereto, and each penetrated by the respective fastener in the coplanar position.

12. The feed-through fitting defined in claim 1 wherein the one arm of each half flange is formed with a pin itself forming part of the groove and about which the half flanges are pivotal together on fitting together of the hooks and grooves.

* * * * *